April 23, 1968     W. R. KNUTSEN     3,379,323

DEVICE FOR MOVING MATERIAL IN A SILO

Filed May 2, 1966     3 Sheets-Sheet 1

INVENTOR.
WILLIES ROALD KNUTSEN

BY

*Linton and Linton*

ATTORNEYS.

April 23, 1968　　　W. R. KNUTSEN　　　3,379,323
DEVICE FOR MOVING MATERIAL IN A SILO

Filed May 2, 1966　　　　　　　　　　　　　　3 Sheets-Sheet 2

INVENTOR.
WILLIES ROALD KNUTSEN
BY
*Linton and Linton*
ATTORNEYS.

INVENTOR.
WILLIES ROALD KNUTSEN
BY
*Linton and Linton*
ATTORNEYS.

United States Patent Office 3,379,323
Patented Apr. 23, 1968

3,379,323
DEVICE FOR MOVING MATERIAL IN A SILO
Willies Roald Knutsen, Hasselasen 808,
Arendal, Norway
Filed May 2, 1966, Ser. No. 546,954
Claims priority, application Sweden, May 3, 1965,
5,756/65
7 Claims. (Cl. 214—17)

ABSTRACT OF THE DISCLOSURE

The present invention relates to a device for stirring and/or breaking up a mass of bulk material in a silo in order to facilitate removal of material therefrom. The device comprises one or more paddle arms, each pivotally connected to a housing mounted on a rotatable shaft arranged vertically and centrally in a silo and extending through at least that part of the silo in which a stirring action is wanted. Preferably the shaft is mounted in the bottom and top walls of the silo and extends through at least one of these walls in order to be rotatable from the outside. In accordance with the present invention each paddle arm consists of a plurality of pivotally connected sections, and a wire or other flexible member is connected at one end to the distal section and guided over the joints between the sections at a distance from the pivoted axis, the other end of the wire being connected to an actuating means in the housing. This actuating means tends to move the sections to a position in which they are aligned and extended radially from the housing.

Description

The present invention relates to silos for bulk material having a centrally arranged vertical rotatably driven shaft provided with one or more substantially horizontally protruding paddle arms eccentrically mounted in a support on the shaft so as to be pivotable in the plane of rotation, the said arms being constantly and resiliently urged to swing outwardly by means of a co-rotating actuating means through a wire, a chain or the like, so that the paddle arms will sweep yieldingly through the material.

A silo having a paddle arm of this kind is shown in Norwegian patent specification No. 101, 986. According to this patent specification the arm is of a length substantially corresponding to one third of the diameter of the silo, the arm being mounted so as to be pivotable about an axis which is spaced from the axis of rotation by a distance corresponding to about one third of the radius of the silo. The arm may be swung from a folded position in which the arm extends under a hood having a diameter of about one third of the diameter of the silo, to a position in which the arm extends almost to the walls of the silo.

An object of the present invention is to provide an improvement of an arrangement of the kind illustrated in the Norwegian patent specification No. 101,986, and the present invention provides a paddle arm which is effective over a greater part of the cross-sectional area of the silo.

In accordance with the present device, each paddle arm is divided into a plurality of pivotally joined rigid arm sections, which are all biased by the actuating means, but to different degrees, so that with increasing resistance from the mass in the silo the individual arm sections will in due order be swung back to effect a successive shortening of the effective length of the paddle arm.

It is preferred to provide for the swing movement from the actuating means, which may be a hydraulic device, to be greater on the outer arm sections than on the sections lying closer to the shaft so that the paddle arm will first swing about the inner joint until the inner arm section is halted by a stop, then about the next joint and so on until the paddle arm is bent back in all the joints. The support may preferably be a housing providing stops for the arm sections and may further have a polygonal basic form having sides of a length corresponding to the length of the arm sections so that the paddle arm is bent around the support with the arm sections lying at the side thereof in contrast to the arrangement illustrated in the said Norwegian patent specification, in which the arm is folded under a protecting hood on the support. By this arrangement there is provided a paddle means which in folded position has a smaller diameter compared with the diameter of the silo. This fact is of great importance relative to the power required and for the construction costs of the plant. Further, said arrangement provides a paddle arm which may be more easily pulled out of a compacted mass in the silo than the previously known paddle arm.

The unequal swinging movement on the individual arm sections may be procured by making the pulling wire or chain extend from the actuating means on the support to the outer arm section and guiding the said wire or chain at a distance from the axes of the joints, the distance from any of these axes being preferably less than the distance from the axes lying further outwards.

In accordance with the invention it is further possible to control the outward swinging of the paddle arm in such a manner that the arm is allowed to reach the outermost wall portions of a non-circular silo without being urged by the actuating means into engagement with those wall portions of the silo which are closer to the axis of the silo.

Further objects of the invention will be in part obvious and in part pointed out in the following detailed description of the accompanying drawings; in which FIG. 1 is a diagrammatical vertical section taken on line 1—1 of FIG. 2 through a silo provided with an arrangement according to the invention;

Figure 6:
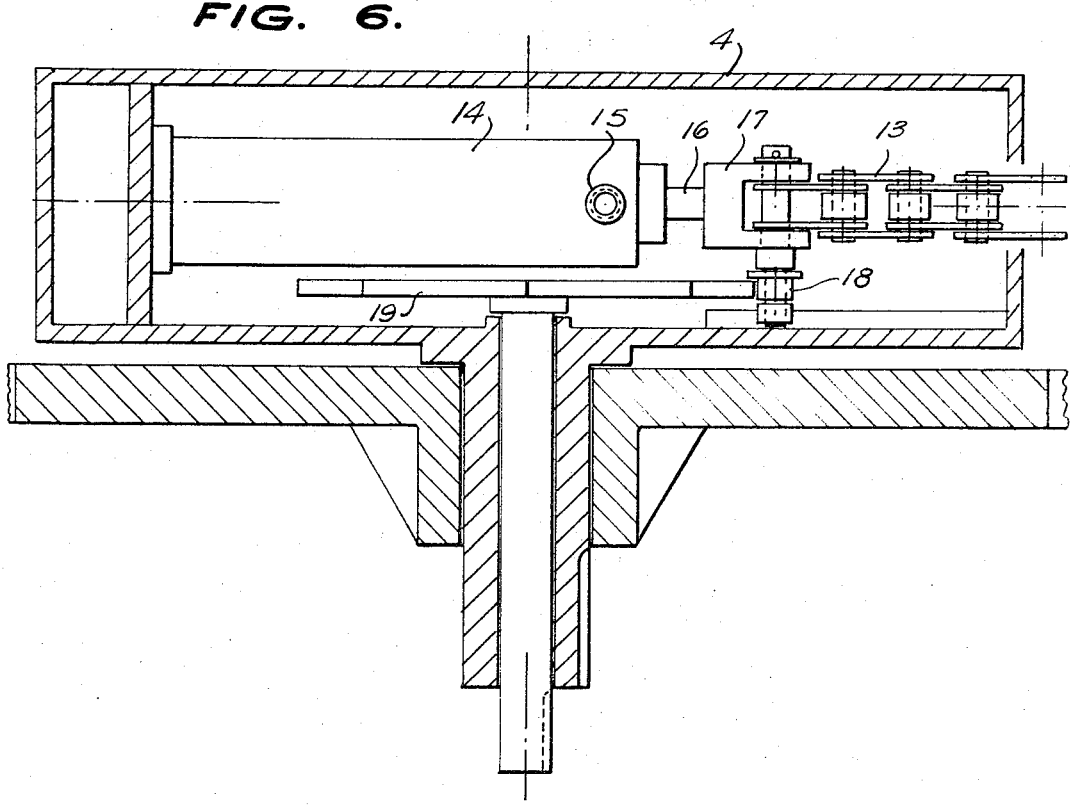
Figure 5:
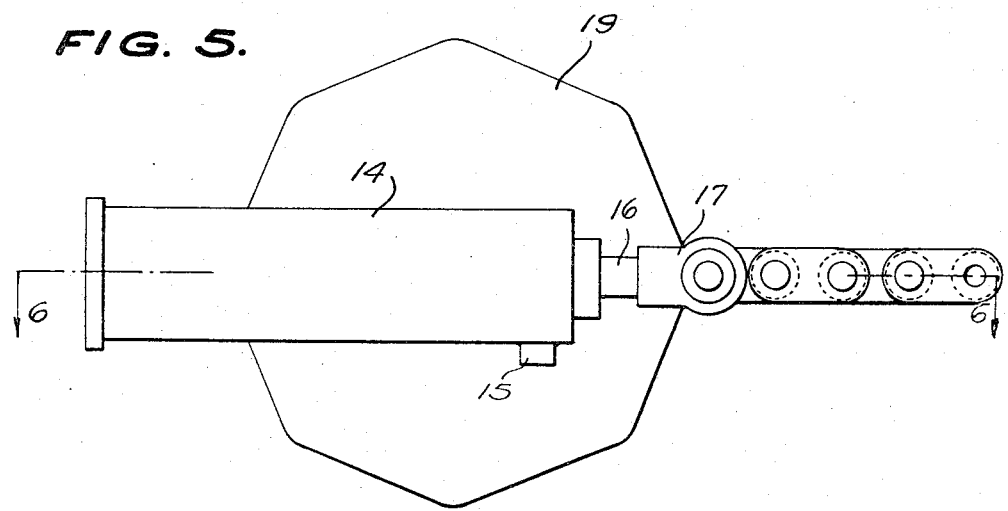

And FIG. 5 finally illustrates diagrammatically and on a substantially larger scale an arrangement for limiting the length to which the wire or the chain may be shortened in order to swing the paddle arm outwards;

And FIG. 6 is a cross-sectional view taken on line 6 of FIG. 5.

Figure 1:
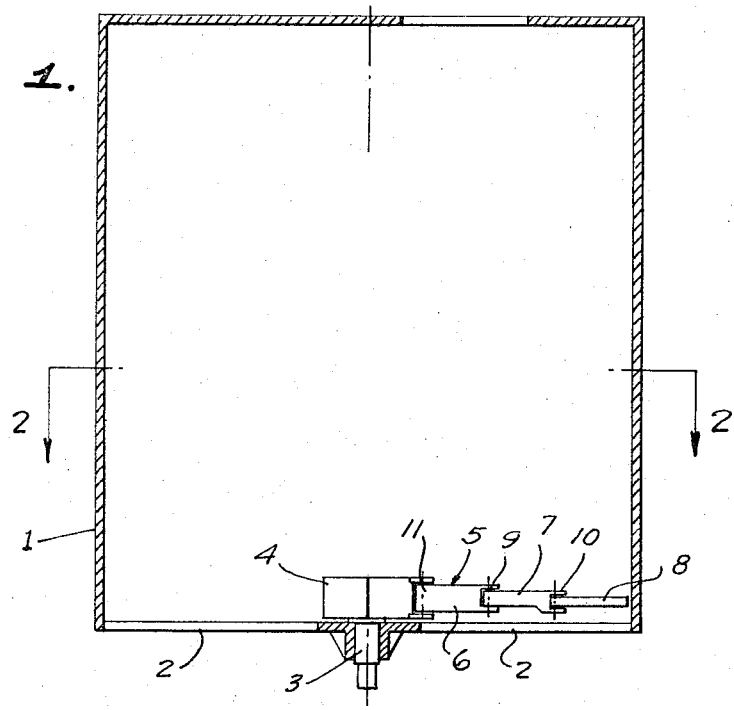
Figure 2:
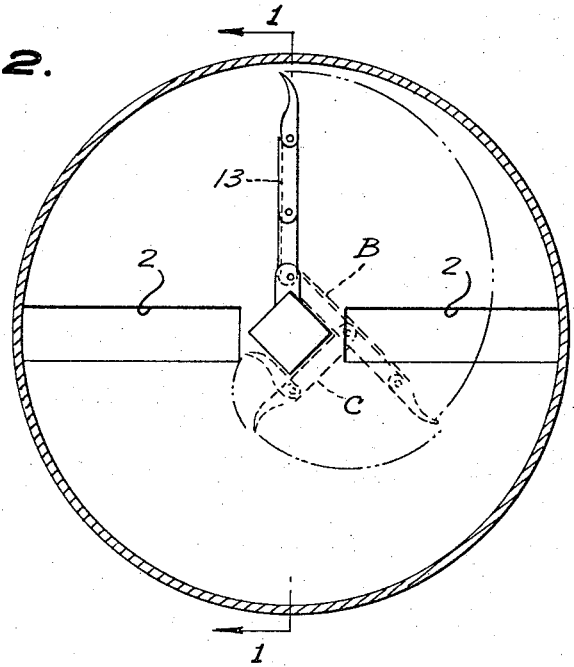
FIG. 2 is a horizontal section taken on line 2—2 of FIG. 1.
Figure 3:
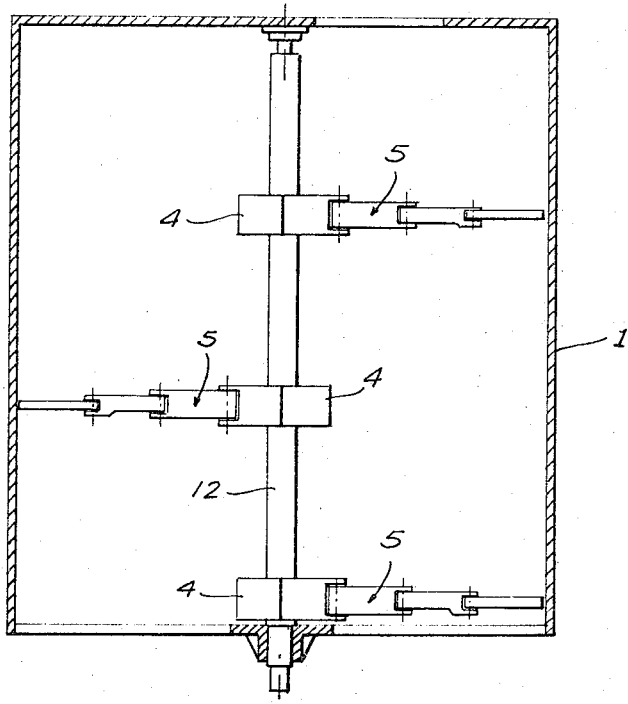
FIG. 3 is a view similar to FIG. 1 of a modification of the present invention.

Referring now more particularly to the accompanying drawings, wherein like and corresponding parts are designated by similar reference characters in FIGS. 1 and 2 the silo itself is designated by 1. In the bottom of the silo there are provided openings 2 for discharge of the material or the mass which, for example, may consist of sawdust, cutter chips, bark or the like either through a chute or by means of a screw conveyor, a lock device or the like (not shown). Through the bottom of the silo there also extends a driven paddle shaft 3 carrying within the silo a housing 4 in which a substantially horizontally protruding padle arm 5 is pivotally mounted. This paddle arm consists of three arm sections 6, 7, and 8, which are pivotally interconnected by means of articulated joints 9 and 10. The hinged connection with the housing 4 is designated by 11.

Figure 4:
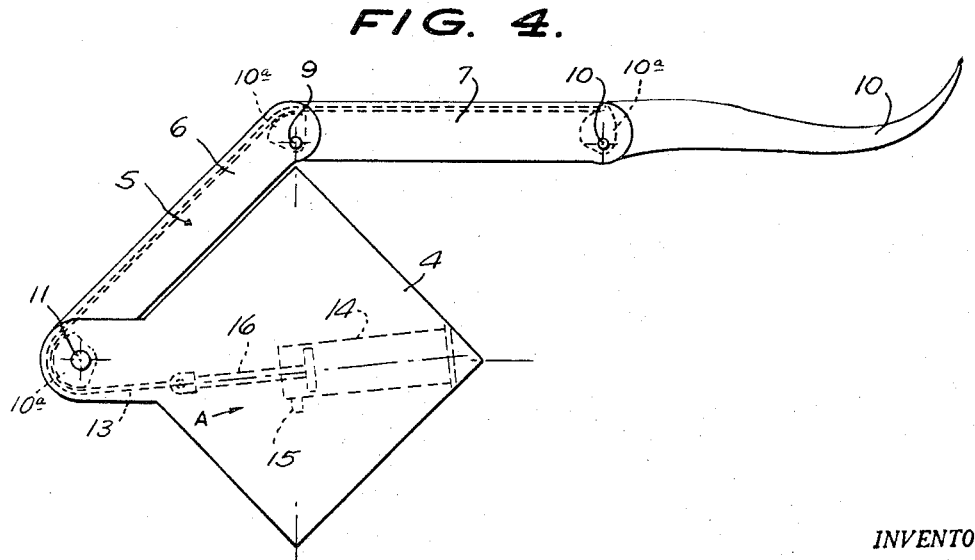
FIG. 4 is an enlarged top view of a support and arm forming a part of the present device.

If the material to be discharged from the silo is of such a consistance that it tends to adhere to the walls, the paddle shaft 3 may be extended to form a shaft 12 as shown in FIG. 4 having a plurality of paddle arms 5 distributed over the length of the shaft 12 and carried by housings 4. It is to be appreciated that the upper housing 4 may each be rotatably mounted on shaft 12 and driven from a separate power source (not shown) so that the lower housing and the two upper housings can be rotated independently of each other or all housings may be fixedly connected to shaft 12.

Through a wire or chain 13 the arm sections 6, 7, and 8 are biased by an actuating means connected thereto provided within the housing 4. This actuating means may for instance consist of a hydraulic cylinder 14 or a hydraulic winch (not shown). The hydraulic pressure media being supplied through the shaft 3 or 12 which can be hollow tubes, a tube connected to inlet 15, or generated by a hydraulic pump provided within the housing or housings 4 if desired or otherwise. The actuating means 15 tends to pull the chain 13 around rollers 10a at each of the joints 9, 10, and 11 in the direction of the arrow A. The chain 13 is connected to the outer arm section 8 and is guided at a distance from the axis of the joints 9, 10, and 11 of the joints in such a manner that the pulling force of the chain provides a moment attempting to straighten out the paddle arm 5. The pulling chain extends at a smalled distance from the axis of the joint 11 than from the axis of the joint 9, and the distance from the axis of the joint 9 is in turn smaller than the distance from the axis of the joint 10. When the paddle arm 5 encounters a resistance from the mass in the silo, or if the pulling force of the chain 13 is reduced, the paddle arm will first be bent back about the joint 11 to the position illustrated at B, in which position the effective length of the paddle arm is reduced and the arm will therefore encounter less resistance from the material in the silo. However, if the resistance against the rotation of the paddle arm should increase or the pulling force of the chain 13 be further decreased, only the arm sections 7 and 8 of the paddle arm will be swung further back, the arm sections 6 now bearing against housing 4. The arm section 8 may be swung still further back in such a way that the three linked arm sections 6, 7 and 8 will bear against the housing 4 as shown at C on three sides without sweeping through any substantial part of the material in the silo. The positions of the paddle arm 5 in which the arm is bent back about the joints 9 and 10 are shown in dotted lines in FIG. 2.

FIGS. 4 and 5 show how the paddle arm may be controlled so as to follow the outer walls of a non-circular silo without being urged by said actuating means into engagement with those wall portions of the silo which are closest to the axis of rotation. The figure illustrates the last links of the pulling chain 13 and an actuating means 14 in the form of a hydraulic cylinder having a piston rod 16 and a head 17 forming a connection with the chain 13. A roller 18 extends from the head 17 and is adapted to co-operate with a stationary cam surface 19 in order to limit the length to which the chain may be pulled in. The cam surface illustrated is intended for an octagonal silo and limits the shortening of the chain so that the chain will not tend to straighten the paddle arm 5 to a position in which the outer end of the arm engages the wall of the silo.

The present invention is capable of considerable modifications and such changes thereto as come within the scope of the appended claims is deemed to be a part thereof.

I claim:

1. In a silo, a device for moving material therein comprising a driven shaft rotatably extending through the bottom of the silo, a housing having a plurality of sides and mounted on said shaft within the silo, an arm pivotally connected at one end to said housing and having a plurality of sections pivotally connected end to end, actuating means mounted in said housing, and a flexible member connected to said actuating means and to the other end of said arm whereby operation of said actuating means can tend to straighten said arm sections radially of said shaft or permit a section at a time to fold against said housing through resistance from material in the silo.

2. In a silo, a device for moving material therein as claimed in claim 1 including additional housings with pivotally connected arms, actuating means and flexible members connected to said actuating means mounted on and spaced apart along said driven shaft.

3. In a silo, a device for moving material therein as claimed in claim 1 wherein said housing is of a polygonal form having sides of a length corresponding to the sections of said arm.

4. In a silo, a device for moving material therein as claimed in claim 1 wherein said actuating means is a hydraulically operated device.

5. In a silo, a device for moving material therein as claimed in claim 1 wherein said flexible member extends from said actuating means to the outer section of said arm and is guided at a distance from the pivotal connections of said arm sections with the distance from any of said pivotal connections being less than the distance from the pivotal connections lying further from said support.

6. In a silo, a device for moving material therein as claimed in claim 1 including a stop in said housing limiting the shortening of said flexible member.

7. In a silo, a device for moving material therein as claimed in claim 1 including a cam mounted in said housing, a roller connected to said arm rolling on said cam and said cam being of a configuration for permitting said arm to reach the outermost wall portion of a non-circular silo without being urged by said actuating means into engagement with those wall portions of said silo which are closer to the axis of said shaft.

References Cited

UNITED STATES PATENTS

| 2,763,362 | 9/1956 | Greaves. | |
| 2,790,563 | 4/1957 | McCarthy | 214—17 |
| 3,011,658 | 12/1961 | Peterson | 222—228 |
| 3,035,718 | 5/1962 | Behlen | 214—17 |

FOREIGN PATENTS

| 571,420 | 3/1959 | Canada. |

ROBERT G. SHERIDAN, *Primary Examiner.*